United States Patent [19]
Soliman et al.

[11] 4,037,713
[45] July 26, 1977

[54] SCRAPER-CHAIN CONVEYORS

[75] Inventors: Mustafa Soliman, Lunen-Sud; Wulff Rösler, Altlunen; Jacob Spies, Dudweiler; Klaus Herberg, Altlunen, all of Germany

[73] Assignee: Gewerkschaft Eisenhutte Westfalia, Westfaliar, Germany

[21] Appl. No.: 453,920

[22] Filed: Mar. 22, 1974

[51] Int. Cl.² .......................... B60D 1/36; F16H 1/00
[52] U.S. Cl. .................................. 198/725; 198/834; 74/243 C; 74/243 DR
[58] Field of Search .......... 74/243 R, 243 C, 243 DR; 198/203, 204, 168, 189, 725, 834; 64/6, 4; 403/359, 312, 298

[56] References Cited

U.S. PATENT DOCUMENTS

| | | | |
|---|---|---|---|
| 2,965,217 | 12/1960 | Dommann et al. | 198/203 |
| 3,360,107 | 12/1967 | Lockwood | 198/203 |
| 3,508,418 | 4/1970 | Jones | 403/359 |
| 3,675,497 | 7/1972 | Thomas | 403/359 |
| 3,685,367 | 8/1972 | Dawson | 74/243 C |

FOREIGN PATENT DOCUMENTS

| | | | |
|---|---|---|---|
| 2,156,030 | 5/1972 | Germany | 74/243 DR |
| 1,198,733 | 8/1965 | Germany | 198/203 |
| 1,257,669 | 12/1967 | Germany | 74/243 R |
| 964,398 | 5/1957 | Germany | 74/243 R |
| 1,231,050 | 5/1971 | United Kingdom | 198/203 |

*Primary Examiner*—Samuel Scott
*Assistant Examiner*—Allan R. Burke
*Attorney, Agent, or Firm*—Lowe, King, Price & Markva

[57] ABSTRACT

A frame assembly for a scraper-chain conveyor which is usable as a drive or reversing station. The assembly has bearing units, which are supported by spaced-apart side walls. A shaft carrying a chain wheel for engagement with the scraper-chain assembly of the conveyor is mounted for rotation between the bearing units. The chain wheel is constructed from separate parts and can be readily attached to or detached from the shaft without removing the latter. The bearing units have hollow projecting parts which accommodate bearings for the shaft which are protected by seals. These projecting parts smoothly merge with the exterior of the chain wheel. The shaft has hollow end portions provided with splines which can be coupled to a journal introduced into the associated end portion from the exterior of the associated bearing unit which also provides access to the bearings and seals. This journal can then be coupled to a drive means to effect rotation of the shaft.

31 Claims, 4 Drawing Figures

SCRAPER-CHAIN CONVEYORS

BACKGROUND OF THE INVENTION

The present invention relates, in general, to scraper-chain conveyors used in mineral mining and in particular to a frame assembly for use with such conveyors.

It is known to provide scraper-chain conveyors with drive and reversing stations at the ends which serve to propel and guide the chain or chains and scrapers attached thereto along the conveyor channel sections. Each station is usually in the form of a frame assembly which has a rotatable shaft provided with a chain wheel for engagement with the chain or chains. It is possible to make each station a drive station although usually with conveyors of moderate length a single drive station is sufficient. The frame assembly constituting the drive station then has a drive means, such as an electric motor or a hydraulic motor, connected through a gearing unit to the shaft thereof. Various arrangements are known which serve to couple the output of the gearing unit which is usually mounted on one of the sides of the assembly, to the shaft. One objective of such arrangements is to make the overall width of the drive station as small as possible. Often these arrangements necessitate special support means and another disadvantage of known constructions is that they are designed for only one type or size of gearing unit. Consequently, in cases where conveyors are installed which require different gearing units extensive modifications are necessary or else a special frame assembly has to be provided for each unit. There is thus a need for a more versatile frame assembly, usable as a drive or reversing station which is able to accept gearing units of different size.

A general object of this invention is to provide an improved form of frame assembly.

SUMMARY OF THE INVENTION

According to the invention there is provided a frame assembly for use with a scraper-chain conveyor. The assembly comprises a shaft with hollow end portions, a chain wheel carried by the shaft for rotation therewith, bearing units having projecting parts into which the end portions of the shaft extend and are supported for rotation, means for supporting the bearing units, and means within the hollow end portions of the shaft enabling the shaft to be selectively coupled to drive means whereby the shaft can be driven. Such an assembly can be used as a drive or reversing station and hence the invention can also provide a conveyor having an assembly made in accordance with the invention at each end.

The support means can be in the form of side walls, to which the bearing units can be attached. These side walls may form part of a channel section of the conveyor or a structural part of the assembly or of another frame connectible to such a channel section.

Preferably, these side walls have recesses therein and the projecting parts of the bearing units have shoulders or the like which locate in these recesses and planar end plates which abut against the side walls. To enable the assembly to cope with different size gearing units, each forming at least part of the aforementioned drive means, the end plates of the bearing units can have various configurations of holes and/or slots which receive bolts associated with these gearing units.

In a preferred construction the projecting parts of the bearing units taper inwardly towards one another and form spaces leading to the end portions of the shaft and accessible from the outside of the units.

These projecting parts may each have a frusto-conical region with a shoulder at its widest part engaging within the associated side wall and having its narrowest part adjoining an end region extending parallel to the shaft. The spaces preferably receive a projecting part of the gearing unit, conveniently of the housing thereof, and to cope with various sizes of gearing units spacing rings can be inserted into the spaces. This arrangement is particularly advantageous in taking up transverse thrust forces from the gearing unit. Which ever space is not used to receive part of a gearing unit can be blocked off with a cover.

The shaft may be rotatably supported by roller bearings which are accommodated in compartments defined in the projecting parts of the bearing units. To protect the roller bearings a plurality of seals can be provided. Preferably, lubrication chambers are provided at each end of each compartment and covers can seal off the chambers which are axially outermost. These covers are then accessible via the spaces formed at the outside of the bearing units. To enable the shaft to be coupled to a gearing unit each of the end portions of the shaft has locating means therein which can be engaged with external locating means of a journal which serves to couple the shaft to said gearing unit. The locating means of the journal and the shaft can be in the form of axial splines and this enables the journal to mesh with a drive gear of the gearing unit. To centralize the journal and the shaft, the hollow portions of the latter may have recesses which receive a collar on the journal. In addition, an expansion screw, which can engage a threaded bore at the base of each hollow portions, is preferably used to secure the journal to the shaft.

The chain wheel is itself preferably made from two parts which can be detached from the shaft. These parts which can be interconnected with screws preferably merge smoothly with the ends of the projecting parts of the bearing units and have the same overall diameter as these ends.

An assembly made in accordance with the invention is usable as a drive or a reversing station and can be used in the former role with gearing units of various sizes without requiring undue space transversely of the conveyor. If desired, the assembly can be used intermediate the ends of the conveyor as an additional drive station. Moreover, the whole assembly can be readily dismantled if desired and the chain wheel thereof can itself be detached without affecting the rest of the assembly.

The invention may be understood more readily and various other features of the invention may become more apparent from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
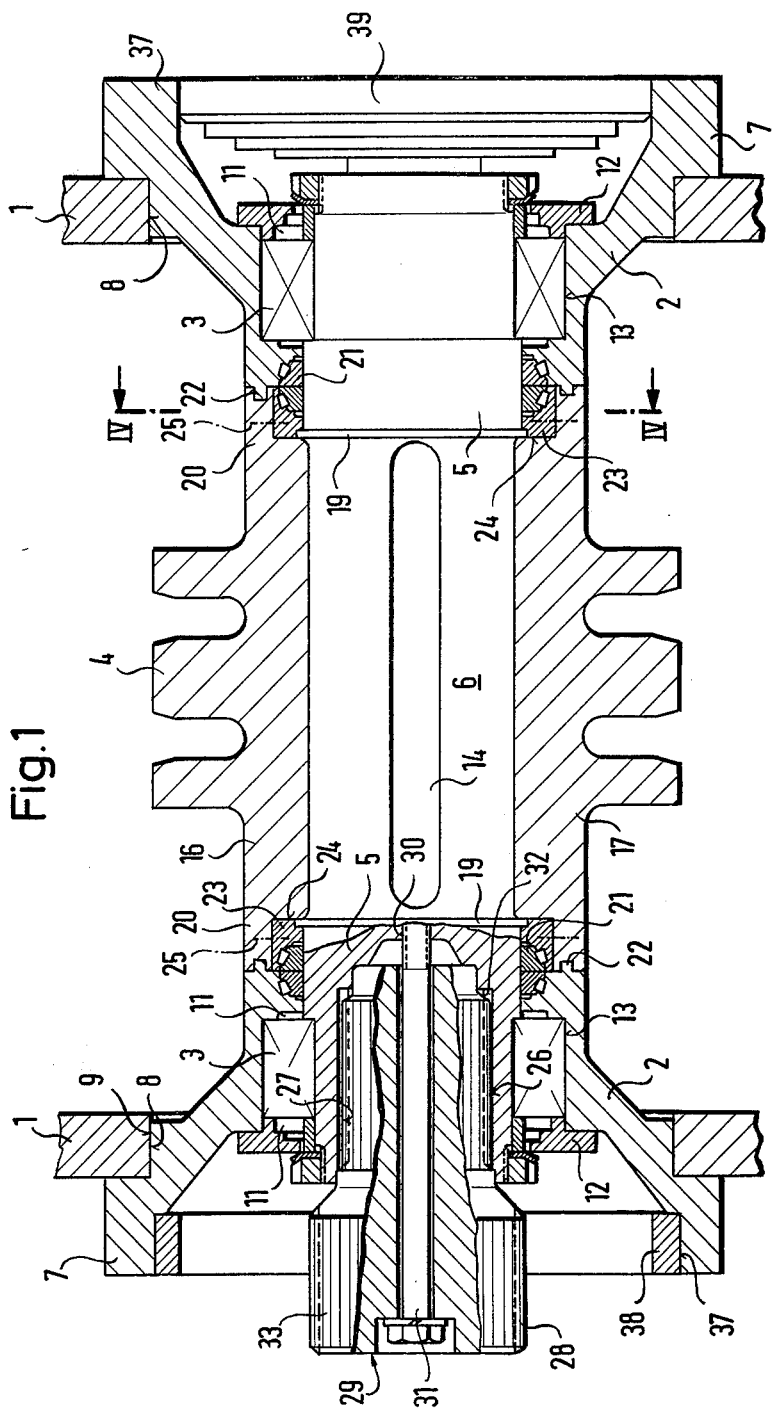
FIG. 1 is a schematic sectional side view of a frame assembly made in accordance with the invention.

Referring initially to FIG. 1, side walls 1, which are only partially shown in the drawing, support bearing units 2 for a shaft 6. The shaft 6 carries, at its central region, a chain wheel 4 which is known manner engages with the central chain of a scraper-chain assembly for a scraper-chain conveyor. In known manner the conveyor has a series of channel sections joined end-to-end and the scraper-chain assembly which is circulated along the channel sections is entrained around a chain wheel at each end of the conveyor. Usually one of the chain wheels is driven while the other is freely rotatable. The assembly made in accordance with the invention can be provided at both ends of the conveyor. A scraper-chain conveyor made in accordance with another feature of the invention has a scraper-chain assembly extending between drive and reversing stations wherein each station has a particular structural configuration. The side walls 1 may be part of one of the conveyor channel sections or of a machine frame adjoining such a channel section or possibly these walls 1 may form a structural part of the assembly of the invention.

The shaft 6 has hollow end portions 5 which extend into the bearing units 2 and the outer surfaces of these portions 5 engage on roller bearings 3 of the units 2 which rotatably support the shaft 6. Each bearing unit 2 has a planar part or plate 7 which extends over a substantial area and connects with the associated side wall 1. Each plate 7 adjoins an inwardly projecting part which has a region of somewhat frusto-conical configuration resembling a hub with an interior surface forming a space or depression 37 accessible from the exterior. The exterior surface of the frusto-conical region of each projecting part has a cylindrical shoulder 8 which seats within a circular recess 9 in the associated wall 1. The plates 7 each have a radial face adjoining the shoulder 8 which abuts the outer surface of the associated side wall 1 and on the other side of the shoulder 8 the projecting part tapers radially inwards from the shoulder 8 and towards the chain wheel 4 to form an end region with a diameter matching that of the shaft 6. Within the projecting part of each plate 7 there is provided a cylindrical compartment 13 which accommodates the roller bearings 3. The compartment 13 communicates with lubrication chambers 11 at its ends. The axially-outermost chambers 11 are sealed off with covers 12 which are accessible from the exterior via the spaces 37 in the plates 7.

Figure 4:
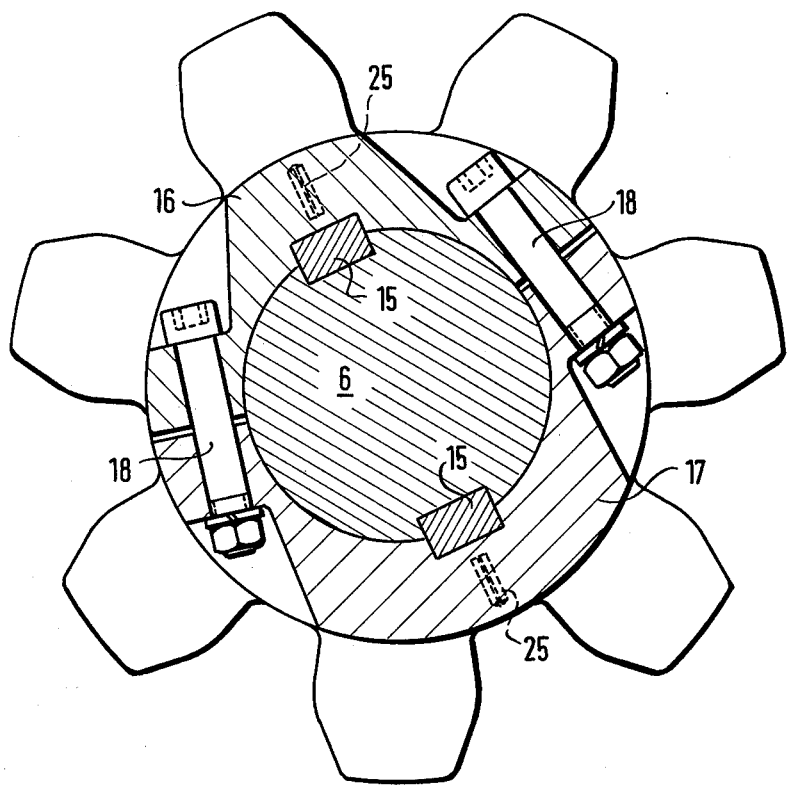
FIG. 4 is a sectional end view of the chain wheel of the assembly, the view being taken along the line IV—IV of FIG. 1.

As shown in FIG. 4, the chain wheel 4 for conveyor operating means is composed of two complementary parts 16, 17 which can be separated radially of the shaft 6. These parts 16, 17 are rotatably fixed to the shaft 6 with the aid of splines 15 engaged in axial keyways 14 and the parts 16, 17 are secured together with nuts and bolts 18 which extend generally tangentially to the shaft 6. The parts 16, 17 are located axially by means of collars 19 on the shaft 6. The chain wheel 4, composed of the assembled parts 16, 17 has protruding ends 20 which mate with the end regions of the projecting parts of the plate 7 and has the same external diameter to form a smoothly merged common exterior.

Sealing means is provided to protect the roller bearings 3. This sealing means takes the form of seals 21, 22. The seals 21 are located between the interiors of the end regions of the projecting parts of the plates 7 and the ends 20 of the chain wheel 4 and the exteriors of the end portions 5 of the shaft 6. Recesses are provided in the end regions of the projecting parts of the plates 7 and the ends 20 of the chain wheel to accommodate the seals 21 and the recesses 24 in the ends 20 also serve to receive packing rings 23. These rings 23 are connected to the ends 20 of the chain wheel 4 with the aid of clamping pins generally designated by the chain-dotted lines 25. The pins 25 can be inserted from the interior of the chain wheel 4 so that the parts 16, 17 thereof can be assembled or dismantled independently of the seals 21. The seals 21 are intended for use for the entire lifetime of the assembly. The seals 22 are in the form of labyrinth seals located between the engaging surfaces of the ends 20 of the chain wheel 4 and the end regions of the projecting parts of the plates 7.

A toothed journal can be inserted into one or other of the end portions 5 of the shaft 6 via the associated space 37 in the end plate 7. By way of example one toothed journal 29, is engaged in the left-hand end portion 5 of the shaft 6 in FIG. 1. This journal 29, which is a replaceable item has external ribs or splines 27, 28 which serve as gear teeth and locating means. The journal 29 is secured to the shaft 6 with an expansion screw 31 which extends through the journal 29 to engage in a threaded bore at the base of the hollow end portion 5 of the shaft 6. The journal 29 has a shoulder 32 at the inner end which locates in a recess formed at the inside of the hollow end portion 5 of the shaft 6, adjacent the base thereof. The shoulder 32 assists in centralizing the journal during its connection to the shaft 6.

The hollow end portions 5 of the shaft 6 each has splines 26 in its interior. By sliding the journal 29 into the end portion 5 of the shaft 6 the spines 27 of the journal 29 locate in the grooves between the splines 26 in the portion 5. The journal 29 has an outer portion 33 which projects beyond the exterior surface of the associated plate 7 and the spines 28 over this portion 33 form teeth which engage a drive gear (not shown) of a gearing unit (not shown) which can be secured to the plate 7. The driving gear then serves to rotate the journal 29 which in turn rotates the shaft 6.

Figure 2:
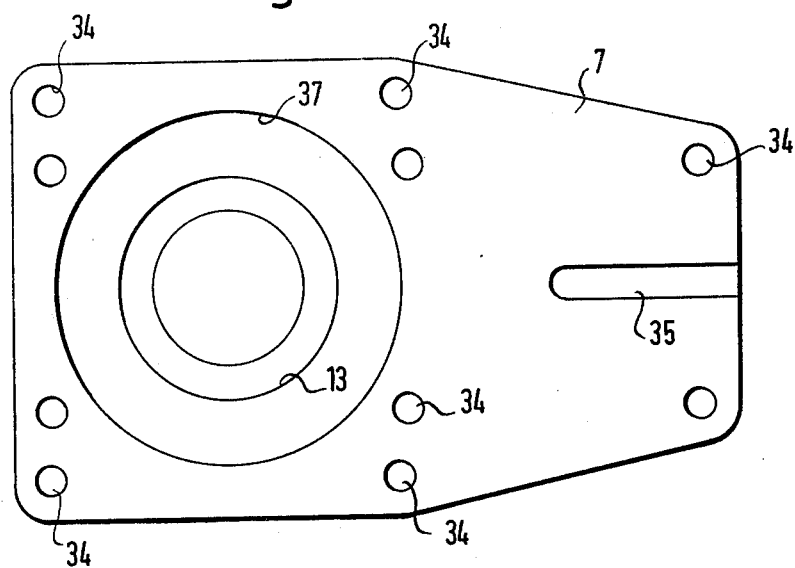
FIG. 2 is an end view of one form of bearing unit end plate for the assembly.
Figure 3:
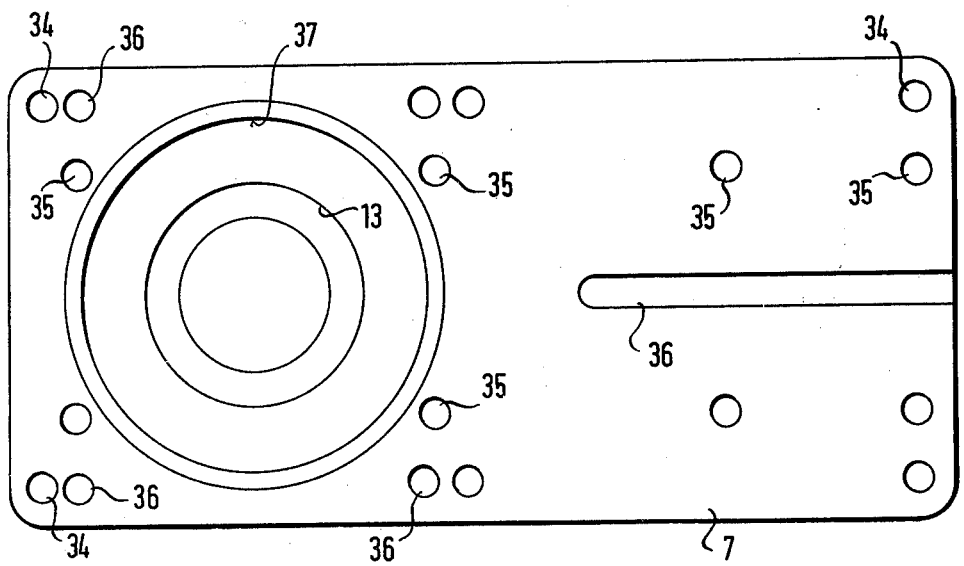
FIG. 3 is an end view of another form of bearing unit end plate for the assembly.

The plates 7 can take various sizes and shapes and over their planar regions the plates 7 have a plurality of holes which serve to receive bolts or the like, for connection to the walls 1 and to the gearing unit. FIGS. 2 and 3 depict two alternative forms for the plates 7 where there are provided holes or slots 34, 35, 36. Gearing units of different sizes can be utilized by selecting the appropriate connection holes in the plates 7. It is desirable to provide the gearing unit with a connection piece which preferably forms part of the main housing construction. This connection piece locates in the space 37 of the associated plate 7. Such an arrangement facilitates assembly and also serves to transmit transverse forces from the gearing unit to the side walls 1 of the assembly via the plate 7. Rings 38 of different radial width can be located in the depression 37 to enable the assembly to cope with gearing units of different size and hence having connection pieces of different size.

Journals 29 can be provided at both ends of the shaft 6 and each journal 29 can be driven by its own gearing unit in the manner described. In this way the shaft 6 is driven from both ends. Usually, however, only one journal 29 and gearng unit would be employed and in this case the bearing unit 2 not provided with the journal 29 can be closed off with a cover plate 39 located in the space 37 of that unit 2.

Where the assembly is used as a reversing station rather than a drive station, i.e. where the shaft 6 is not driven, the journal 29 and drive gearing unit would be omitted and in this case both units 2 can be closed off with cover plates 39.

We claim:
1. A frame assembly for use with a scraper-chain conveyor; said assembly comprising:
   a. a solid, continuous shaft with hollow end portions,
   b. said shaft extending over substantially the entire width of the assembly,
   c. a chain wheel carried by the shaft for rotation therewith,
   d. two substantially identical bearing units having inwardly projecting parts with a frusto-conical region including a shoulder extending towards the center of the shaft into which the end portions of the shaft are received and are supported for rotation,
   e. the bearing units being arranged symmetrically of the assembly,
   f. means for supporting the bearing units with said shoulder of the bearing unit being engaged with the supporting means, and
   g. spline or key means within the hollow end portions of the shaft and journal coupling means having external locating means engageable with said spline or key means enabling the shaft to be selectively coupled to drive means whereby the shaft can be driven from either end.

2. An assembly according to claim 1, wherein said support means comprises side walls which form part of a channel section of the conveyor.

3. An assembly according to claim 1, wherein said support means form a structural part of the assembly.

4. An assembly according to claim 1, wherein the support means comprises side walls which have circular recesses therein and the projecting parts of the bearing units have shoulders which locate within the recesses and planar end plates which engage against the side walls.

5. An assembly according to claim 4, wherein said end plates are provided with holes, some of which serve for enabling attachment to the side walls and the remainder of which serve for enabling drive gearing units of different size to be connected thereto, each of the gearing units, when thus connected, forming at least part of the drive means.

6. An assembly according to claim 1, wherein the projecting parts of the bearing units taper inwardly towards one another and form spaces leading to the end portions of the shaft, said end portions being accessible from the outside of the bearing units.

7. An assembly according to claim 6, wherein the spaces formed by the bearing units serve for locating part of a gearing unit forming at least part of the drive means.

8. An assembly according to claim 1, wherein
   the projecting parts of the bearing units each have an end region and a frusto-conical region having a widest part and a narrowest part with a shoulder at its widest part engaging within the associated support means and having its narrowest part adjoining said end region extending parallel to the shaft.

9. An assembly according to claim 1, wherein said coupling means for each of the end portions of the shaft is in the form of locating means which can be engaged with external locating means of a journal which serves to couple the shaft to said drive means.

10. An assembly according to claim 9, wherein the journal has teeth which can be meshed with a drive gear of a gearing unit.

11. An assembly according to claim 9, wherein said hollow end portions are formed with a bore having a base and the journal can be secured to the shaft by means of an expansion screw which can engage in a threaded bore provided at said base of each of said hollow portions.

12. An assembly according to claim 11, wherein each of said hollow portions has a recess adjacent the base which can receive a collar provided on the journal.

13. An assembly according to claim 10, wherein the locating means in the hollow portions of the shaft and the locating means and teeth on the journal are in the form of splines exending axially thereof.

14. An assembly according to claim 1, wherein the chain wheel is composed of two complementary parts which can be detached from the shaft.

15. An assembly according to claim 14, wherein the chain wheel parts and the shaft are provided with interengageable splines and keyways extending axially of the shaft and the shaft has collars against which the chain wheel parts can abut.

16. A scraper-chain conveyor with a scraper-chain assembly extending between drive and reversing stations, each station comprising:
   a. a solid, continuous shaft with a hollow end portions,
   b. said shaft extending over substantially the entire width of the station,
   c. a chain wheel carried by the shaft and drivably engaging said assembly,
   d. two substantially identical bearing units having inwardly projecting parts extending towards the center of the shaft into which the hollow end portions of the shaft are received and are supported for rotation,
   e. the bearing units being arranged symmetrically of the station,
   f. means for supporting the bearing units and spline or key means within the hollow end portions of the shaft, and
   g. journal coupling means having external locating means engageable with said spline or key means enabling the shaft to be selectively coupled to drive means from either side.

17. A frame assembly for use with a scraper-chain conveyor; said assembly comprising:
   a. a solid, continuous shaft with hollow end portions;
   b. a chain wheel carried by the shaft for rotation therewith,
   c. bearing units disposed at each end portion of the shaft and each bearing unit having a projecting part into which an end portion of the shaft extends and is supported for rotation,
   d. means for supporting the bearing units, and
   e. internal locating means within the hollow end portions of the shaft and journal coupling means having external locating means engageable with the internal locating means enabling the shaft to be selectively coupled to drive means whereby the shaft can be driven,
   f. said projecting parts of the bearing units taper inwardly towards one another and form spaces leading to the end portions of the shaft and accessible from the outside of the units, g. said spaces formed by the bearing units serve for locating part of a gearing unit forming at least part of the drive means, h. the dimensions of said spaces can be altered to accommodate various gearing units by introducing one or more spacing rings therein.

18. A frame assembly for use with a scraper-chain conveyor; said assembly comprising:
   a. a solid, continuous shaft with hollow end portions,
   b. a chain wheel carried by the shaft for rotation therewith,
   c. bearing units having projecting parts into which the end portions of the shaft extend and are supported for rotation,
   d. said projecting parts including ends, compartments which accommodate roller bearings and lubricating chambers disposed at the ends of said projecting parts,
   e. covers for sealing off the lubricating chambers adjacent the roller bearings,
   f. means for supporting the bearing units,
   g. internal locating means within the hollow end portions of the shaft, and
   h. journal coupling means having external locating means engageable with said internal locating means enabling the shaft to be selectively coupled to drive means whereby the shaft can be driven.

19. An assembly according to claim 18 wherein sealing means is provided to protect said roller bearings.

20. An assembly according to claim 19, wherein said sealing means comprises seals located axially inwards of the roller bearings and between the end portions of the shaft and the projecting parts of the bearing units.

21. An assembly according to claim 20, wherein the projecting parts of the bearing units have recesses for receiving said seals.

22. An assembly according to claim 21, wherein said sealing means includes packing rings and the chain wheel has recesses which serve to receive said seals and packing rings.

23. An assembly according to claim 22, wherein said packing rings are secured to the chain wheel with the aid of clamping pins.

24. An assembly according to claim 20, wherein said sealing means further comprises labyrinth seals disposed between the ends of the projecting parts of the bearing units and the chain wheel.

25. A frame assembly for use with a scraper-chain conveyor, said assembly comprising:
   a. a solid, continuous shaft with hollow end portions,
   b. a chain wheel carried by the shaft for rotation therewith,
   c. bearing units disposed at each end portion of the shaft and each bearing unit having a projecting part into which an end portion of the shaft extends and is supported for rotation,
   d. means for supporting the bearing units, and
   e. internal locating means within the hollow end portions of the shaft and journal coupling means having external locating means engageable with the internal locating means enabling the shaft to be selectively coupled to drive means whereby the shaft can be driven, f. said projecting parts of the bearing units taper inwardly towards one another and form spaces leading to the end portions of the shaft and accessible from the outside of the units, g. said spaces formed by the bearing units serve for locating part of a gearing unit forming at least part of the drive means, h. either of said spaces can be sealed off with a cover plate when not used to locate part of a gearing unit.

26. An assembly for use with a conveyor; said assembly comprising:
   a. a solid, continuous shaft extending over substantially the entire width of the assembly and having hollow end portions,
   b. conveyor operating means carried by the shaft for rotation therewith,
   c. said conveyor operating means including a chain wheel and chain-engaging means,
   d. said chain wheel being composed of separate components keyed to said shaft,
   e. said chain-engaging means being disposed at the center of said shaft,
   f. bearing units mounted to a frame at each end of the shaft for rotation therewith,
   g. coupling means including an internally splined, axial bore being disposed within each said hollow end portion, and
   h. drive means including a coupling piece having an externally splined outer surface portion at one end thereof to selectively engage said internally splined axial bores of said coupling means to drive the shaft from either of said end portions,
   i. said coupling piece having a larger diameter portion at the other end thereof,
   j. said larger diameter portion being adapted for connection to a drive gear unit.

27. An assembly according to claim 26, wherein said bearing units have projecting parts into which said end portions extend for rotatable support.

28. An assembly according to claim 27, wherein
the projecting parts taper inwardly toward one another and form spaces leading to the end portions of the shaft,
said end portions being accessible from the outside of the bearing units.

29. An assembly according to claim 27, wherein
the projecting parts each have an end region and a frusto-conical region having a widest part and a narrowest part with a shoulder at its widest part and having its narrowest part adjoining said end region extending parallel to the shaft.

30. An assembly according to claim 27, wherein
the projecting parts have a plurality of axially disposed chambers including compartments, lubricating chambers and covers,
said compartments accommodate roller bearings, said lubricating chambers are disposed at the ends of and communicate with said compartments, and said covers are provided for sealing off axially outermost chambers.

31. An assembly according to claim 27, wherein
said bearing units are substantially identical and arranged symmetrically of the assembly.

* * * * *